(12) United States Patent
Kingston

(10) Patent No.: US 6,973,381 B2
(45) Date of Patent: Dec. 6, 2005

(54) METHOD OF OPERATING AN ANTI-LOCK BRAKING SYSTEM

(75) Inventor: Andrew Kingston, Waldesch (DE)

(73) Assignee: Lucas Automotive GmbH, (DE)

( * ) Notice: Subject to any disclaimer, the term of this patent is extended or adjusted under 35 U.S.C. 154(b) by 14 days.

(21) Appl. No.: 10/853,531

(22) Filed: May 25, 2004

(65) Prior Publication Data
US 2004/0220715 A1 Nov. 4, 2004

Related U.S. Application Data

(63) Continuation of application No. PCT/EP02/13239, filed on Nov. 25, 2002.

(30) Foreign Application Priority Data
Nov. 27, 2001 (DE) ............................... 101 58 026

(51) Int. Cl.$^7$ .............................................. B60T 8/32
(52) U.S. Cl. ..................................... 701/78; 303/198
(58) Field of Search ............................. 701/71, 78, 48; 303/189, 191, 198

(56) References Cited

U.S. PATENT DOCUMENTS

| 3,632,177 | A | * | 1/1972 | Packer ..................... 303/198 |
| 4,093,316 | A | * | 6/1978 | Reinecke .................. 303/198 |
| 4,755,008 | A | | 7/1988 | Imoto et al. |
| 4,778,223 | A | | 10/1988 | Inoue |
| 5,011,236 | A | * | 4/1991 | Toepfer et al. ............. 303/198 |
| 5,267,161 | A | * | 11/1993 | Kallenbach et al. .......... 701/37 |
| 5,505,532 | A | | 4/1996 | Tozu et al. |
| 5,855,419 | A | * | 1/1999 | Urai et al. ................ 303/9.69 |
| 6,614,343 | B1 | | 9/2003 | Fennel et al. |
| 6,763,288 | B2 | * | 7/2004 | Caretta et al. ................ 701/1 |
| 2002/0038193 | A1 | * | 3/2002 | Grunberg et al. ........... 702/173 |
| 2002/0095253 | A1 | * | 7/2002 | Losey et al. ................. 701/71 |

FOREIGN PATENT DOCUMENTS

| DE | 41 33 238 | | 4/1993 |
| DE | 197 44 725 | | 4/1999 |
| DE | 100 50 421 | | 5/2002 |
| JP | 04-39113 | * | 2/1992 |

OTHER PUBLICATIONS

Document Bibliography and Abstract for DE 197 44 725 from the European Patent Office website; http://v3.espacenet.com/textdoc?DB=EPODOC&IDX=DE19744725, printed May 19, 2004.

* cited by examiner

Primary Examiner—Michael J. Zanelli
(74) Attorney, Agent, or Firm—MacMillan, Sobanski & Todd, LLC

(57) ABSTRACT

The invention relates to an anti-lock braking system as well as to a method of operating the anti-lock braking system. As a function of the motional state of at least one wheel control commands are generated for at least one actuator (12) of the anti-lock braking system. During generation of the control commands a quantity characteristic of the vertical tyre force is taken into account.

16 Claims, 2 Drawing Sheets

METHOD OF OPERATING AN ANTI-LOCK BRAKING SYSTEM

CROSS REFERENCE TO RELATED APPLICATIONS

This application is a continuation of International Application No. PCT/EP02/13239 filed Nov. 25, 2002, the disclosures of which are incorporated herin by refernce, and which claimed priority to German Patent Application No. 101 58 026.6 filed Nov. 27, 2001, the disclosures of which are incorporated herein by reference.

BACKGROUND OF THE INVENTION

The invention relates to a method of operating an anti-lock braking system, in which as a function of the motional state of a wheel control commands are generated for an actuator.

With conventional ABS, the motional state of one or more wheels is monitored by means of wheel-speed sensors. In the event of incipient lock at one wheel, there is a sharp increase in wheel deceleration and wheel slip. As soon as these two parameters exceed specific critical values, a control unit of the ABS issues control commands to one or more actuators in the form of e.g. solenoid-valve units. The actuators then stop the build-up of the wheel brake pressure or reduce this pressure until the risk of locking has been eliminated. To prevent under-braking of the wheel, the brake pressure then has to be built up again. In the course of this brake regulation there has to be alternate detection of the stability and the instability of the wheel motion, and a cyclic sequence of pressure-rise, pressure-holding and pressure-reduction phases has to be used to regulate the wheel in the slip range with maximum braking force.

With conventional ABS, the motional state of one or more wheels is monitored by means of wheel-speed sensors. In the event of incipient lock at one wheel, there is a sharp increase in wheel deceleration and wheel slip. As soon as these two parameters overwrite specific critical values, a control unit of the ABS issues control commands to one or more actuators in the form of e.g. solenoid-valve units. The actuators then stop the build-up of the wheel brake pressure or reduce this pressure until the risk of locking has been eliminated. To prevent under-braking of the wheel, the brake pressure then has to be built up again. In the course of this brake regulation there has to be alternate detection of the stability and the instability of the wheel motion, and a cyclic sequence of pressure-rise, pressure-holding and pressure-reduction phases has to be used to regulate the wheel in the slip range with maximum braking force.

The ABS has to take a number of disturbance values into account. These include e.g. changes of the adhesion between tyre and road, uneven road surfaces that cause wheel- and axle vibrations, etc.

SUMMARY OF THE INVENTION

The invention relates to method of operating an anti-lock braking system that is notable for improved functionality, particularly given uneven road surfaces and pitching motions of the vehicle. The invention also relates to providing an improved anti-lock braking system.

In a method of operating an anti-lock braking system of the initially described type, this is achieved according to the invention in that a quantity characteristic of the vertical tyre ("tire " in the American English spelling) force, also known as wheel load or wheel contact force, is determined and this quantity is taken into account when generating the control commands for the at least one actuator. This also includes the situation where a plurality of quantities characteristic of the vertical tyre force are used to generate the control commands.

Conventional anti-lock braking systems are unable to distinguish between a change of the adhesion between tyre and road, on the one hand, and a change of the vertical tyre force, on the other hand. For this reason, in specific situations, such as very uneven road surfaces or pitching motions of the vehicle that occur, for example, when pulling away or coming to a halt, there is sub-optimum brake regulation by the ABS. The fact, that the ABS according to the invention takes a quantity characteristic of the vertical tyre force into account as a separate parameter for the regulation of an ABS-assisted braking operation, means that in many situations the directional stability may be improved and the braking distance may be shortened.

The quantity characteristic of the vertical tyre force may be either the vertical tyre force itself or one or more other parameters that allow a conclusion to be drawn about the vertical tyre force. Such parameters may be derived from the suspension system and/or the damping system and/or from other subsystems of the vehicle.

For example, the spring travel, which may be measured, estimated or calculated, allows a conclusion to be drawn about the vertical tyre force. In addition to or instead of the spring travel, spring constants and/or damper constants may be taken into account when determining the quantity characteristic of the vertical tyre force. It is also conceivable to determine the quantity characteristic of the vertical tyre force with the aid of a detected spring force or a detected spring pressure (active suspension).

When generating the control commands, tyre characteristics may simultaneously be taken into account. This taking account of tyre characteristics may be effected e.g. in that the tyre characteristics are already simultaneously involved in determining the vertical tyre force, or in that the quantity characteristic of the vertical tyre force and the tyre characteristics are taken separately into account when generating the control commands.

Determining the quantity characteristic of the vertical tyre force may be effected in various ways. For example, this quantity may be determined by estimation, measurement or calculation. According to a preferred variant of the invention, determination of the quantity characteristic of the vertical tyre force is a multi-stage process whereby, in a first step, one or more first parameters such as e.g. the spring travel are detected and, in a second step, on the basis of these parameters a conclusion is drawn about the vertical tyre force. The quantity, which is characteristic of the vertical tyre force and is taken into account when generating the control commands, may however also be determined directly, i.e. without such intermediate steps.

The control commands are expediently generated in such a way that upon a change of the vertical tyre force they are directed towards a change of a manipulated variable of the anti-locking braking system in the same direction. Thus, for example, upon a reduction of the vertical tyre force the brake pressure may be likewise reduced and upon an increase of the vertical tyre force the brake pressure is likewise increased. Preferably, determination of the vertical tyre force and regulation of the brake pressure based thereon is effected separately for the individual wheels of the vehicle.

Generation of the control commands may be effected in one or more stages. In the case of single-stage generation of the control commands, the quantity characteristic of the vertical tyre force is taken into account directly, e.g. as a separate input variable of an ABS control unit, when generating the control commands. It is however also conceivable, in a first stage, first to generate a compensation signal on the basis of the quantity characteristic of the vertical tyre force and by means of said compensation signal bring an influence to bear upon such control commands as have been generated uncompensated, i.e. without taking into account the quantity characteristic of the vertical tyre force. This may occur in such a way that firstly uncompensated control commands are generated while taking account of the motional state of at least one wheel and then the (compensated) control commands for the at least one actuator are generated on the basis of the uncompensated control commands while taking the compensation signal into account.

During generation of the control commands an electrical signal, which is characteristic of a braking request, may additionally be taken into account. Such a signal is generated e.g. in electrohydraulic braking systems. The method according to the invention may however also be used for conventional braking systems, in which the braking force summoned up by a driver is transmitted by means of leverage of the brake pedal mechanically to a vacuum brake booster and then, after boosting, onwards to a master cylinder.

The invention may be used both in the form of a control program, which is stored in a volatile or non-volatile memory or on a data carrier, or in the form of equipment. As far as the equipment development of the anti-lock braking system is concerned, means may be provided for determining the quantity characteristic of the vertical tyre force, wherein the determined quantity characteristic of the vertical tyre force is taken into account by the ABS when generating the control commands.

Other advantages of this invention will become apparent to those skilled in the art from the following detailed description of the preferred embodiment, when read in light of the accompanying drawings.

DETAILED DESCRIPTION OF THE INVENTION

Figure 1:
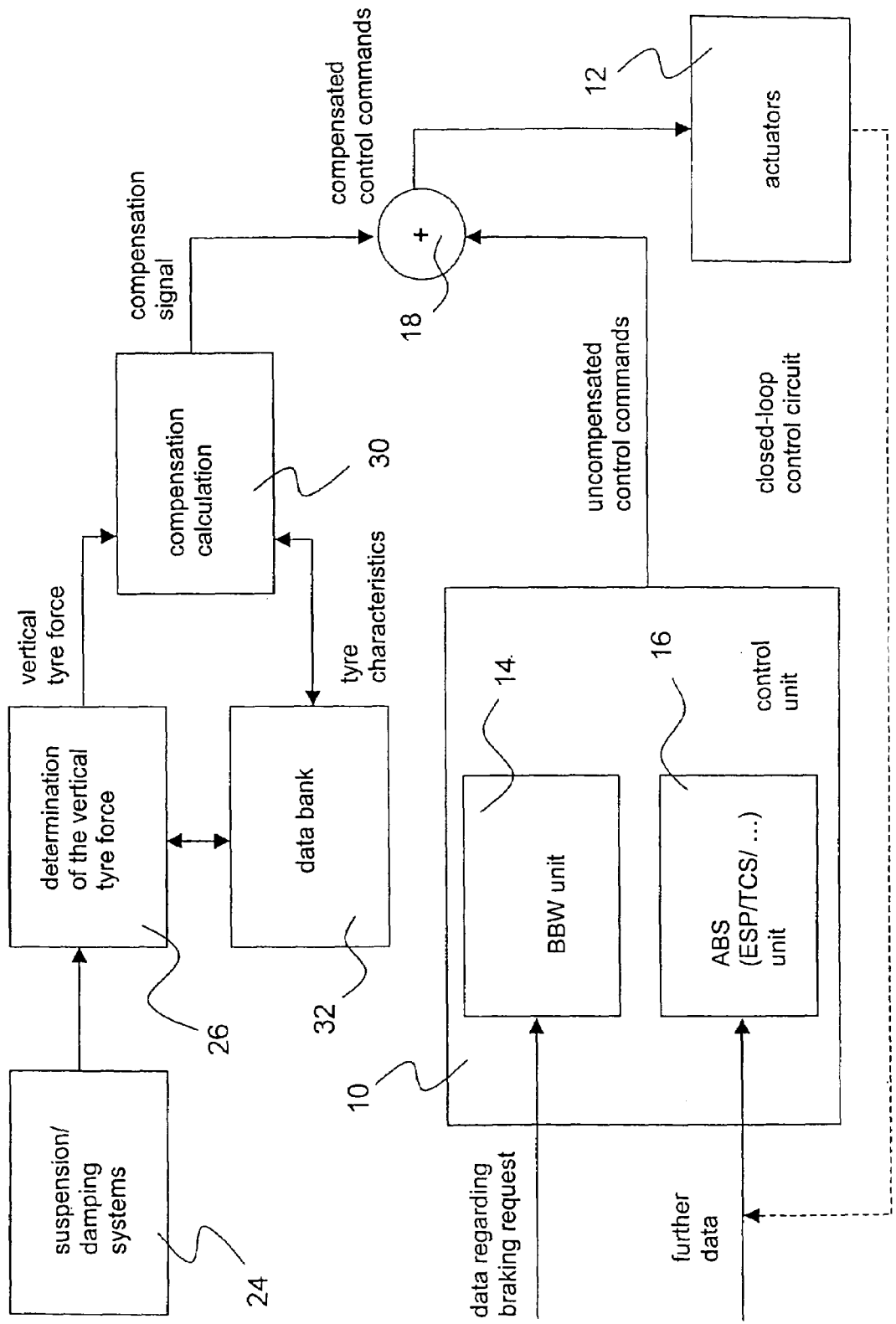
FIG. 1 a schematic block diagram of an ABS according to the invention.

In FIG. 1 an embodiment of an ABS according to the invention for an electrohydraulic braking system is illustrated. The ABS in a known manner comprises a control unit 10 and one actuator 12 per wheel, each in the form of a wheel pressure modulator. The control unit 10 comprises a brake-by-wire (BBW) unit 14 as well as an ABS unit 16. In the ABS unit 16 of the control unit 10 further functions such as the traction control system (TCS) and the electronic stability program (ESP) are programmed in.

The BBW unit 14 of the control unit 10 receives data regarding a braking request in the form of electrical signals, which have been generated e.g. by a pedal-travel sensor. The ABS unit 16 with ESP and TCS function of the control unit 10 receives from further sensors further data regarding the driving mode, such as velocity or cornering, and regarding the motional state of the wheels. From the braking-request data and the further data the control unit determines control commands for the actuators 12. The actuators 12 convert the received control commands into the corresponding manipulated variable, i.e. into brake pressures for the wheel cylinders. The tyres/road controlled system and the sensors for detecting the further data in a known manner form a closed-loop control circuit.

The ABS illustrated in FIG. 1 has an interface 18 enabling a higher-level control intervention from outside in the ABS regulation. The interface 18 therefore allows the vertical tyre force to be taken into account during generation of the control commands for the actuators 12.

Figure 2:
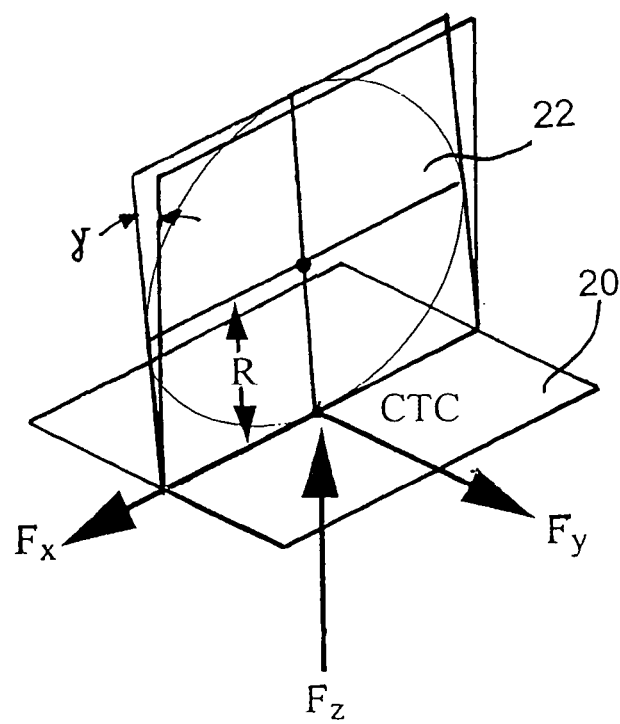
FIG. 2 a schematic representation of the vertical tyre force.

There now follows a detailed description with reference to FIG. 2 of the effective direction of the vertical tyre force $F_z$. FIG. 2 shows a wheel 22 running on a road 20 and having an instantaneous running radius R. As FIG. 2 reveals, the wheel has a specific inclination γ relative to the road 20. The point of application of the tyre force on the road 20 is denoted by CTC (centre of tyre contact). With reference to the road plane, the tyre force may be split into three components of force $F_X$, $F_Y$, $F_Z$. The vertical tyre force $F_Z$ denotes the component of the tyre force that acts normally relative to the road plane.

As already explained, in the ABS according to the embodiment illustrated in FIG. 1 the vertical tyre force $F_Z$ is taken into account by means of an intervention in the ABS closed-loop control circuit. To put it more precisely, the interface 18 makes it possible for a tyre force compensation signal to be taken into account for the generation of compensated control commands. In the embodiment illustrated in FIG. 1, compensation of the uncompensated control commands generated by the control unit 10 is effected by means of the interface 18. For this purpose, the interface 18 has a signal-processing functionality, which allows the interface 18 to generate compensated control commands for the actuators 12 on the basis of the (uncompensated) control signals of the control unit 10, on the one hand, and the compensation signal, on the other hand. This may be effected e.g. by adding the compensation signal as an additive component to the uncompensated control commands.

Other developments for the injection of the compensation signal into the ABS closed-loop control circuit are conceivable. It would, for example, be possible to use the compensation signal as a further input signal for the control unit 10 so that the control unit 10 generates the compensated control commands for the actuators 12 directly, i.e. without the intermediate step of generating uncompensated control commands.

There now follows a detailed description with reference to FIG. 1 of the generation of the compensation signal. The compensation signal is generated in a separate open loop, which is connected by means of the interface 18 to the ABS closed-loop control circuit. To generate the compensation signal, there is recourse to parameters of suspension/damping systems 24 of the vehicle. To put it more precisely, a unit 26 for determining the vertical tyre force has recourse to the suspension/damping systems 24. During this recourse of the unit 26 to the suspension/damping systems 24 the spring travel as well as the gradient of the spring travel are determined.

Figure 3:
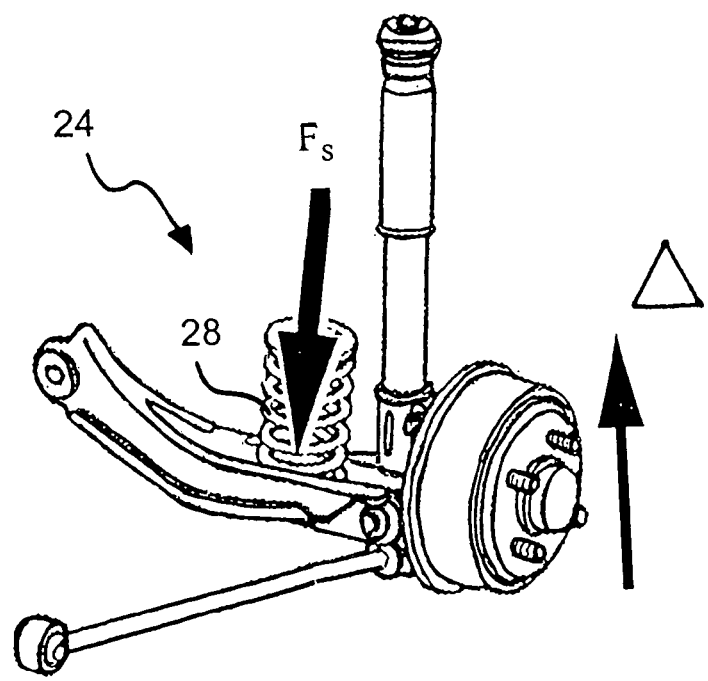
FIG. 3 a schematic representation of the spring travel and the spring force, which arise in a suspension system of a motor vehicle.

Some parameters of relevance to the determination of the vertical tyre force are graphically explained in detail in the suspension/damping systems 24 illustrated in FIG. 3. In FIG. 3 the spring force $F_S$ and the spring travel Δ are indicated in the form of arrows. The spring force $F_S$ is the force that gives rise to compression of the spring 28. The spring travel $\Delta$ denotes the relative displacement connected therewith at the wheel.

The unit 26 illustrated in FIG. 1 for determining the vertical tyre force receives the measured, estimated or otherwise determined parameters, spring travel $\Delta$ and time gradient of the spring travel $\Delta$, and from these and from further data determines the vertical tyre force $F_Z$. The vertical tyre force $F_Z$ is a function of the spring force $F_S$ and the damper force $F_D$, $F_Z=f(F_S,F_D)$. The spring force $F_S$ may be derived from the spring travel $\Delta$, with $F_S=f(\Delta)$. The damper force $F_D$ may be determined from the first time derivative of the spring travel $\Delta$ as well as from the damper characteristic curve K, $F_D=f(d\Delta/dt,K)$. The damper characteristic curve K is filed in a data bank 32, to which the unit 26 has recourse for determining the vertical tyre force.

The vertical tyre force determined by the unit 26 is supplied to a compensation-calculating circuit 30. The compensation-calculating circuit 30 calculates a suitable compensation signal, which is injected by means of the interface 18 into the ABS closed-loop control circuit. For this calculation of the compensation signal, the compensation-calculating circuit 30 has recourse to the data bank 32. The data bank 32, in addition to the data regarding the damper characteristic curve, also contains data regarding the tyre characteristics, such as tyre diameter, tyre width, tyre pressure etc. The taking of such tyre characteristics into account when calculating the compensation signal allows even better regulation of the ABS.

In a departure from the embodiment illustrated in FIG. 1, the tyre characteristics may already be taken into account during determination of the vertical tyre force. In said case, the unit 26 has direct recourse to the data bank 32.

The compensation-calculating circuit 30 calculates the compensation signal as a function of a change of the vertical tyre force in such a way that the control commands compensated by means of the compensation signal and supplied to the actuators 12 give rise to a change of the brake pressure in the same direction. This leads, in the case of a reduction of the vertical tyre force, to a reduction of the brake pressure, and vice versa.

In accordance with the provisions of the patent statues, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of operating an anti-lock braking system, in which as a function of the motional state of at least one wheel control commands are generated for at least one actuator, comprising the steps:
    a) determining on a continual basis a quantity characteristic of a vertical tire force that is subject to variation during vehicle travel; and
    b) generating the control commands for said at least one actuator during an anti-look control intervention taking into account the quantity determined in step (a).

2. The method according to claim 1, wherein step (a) comprises the taking into account of at least one parameter connected with at least one of a suspension system and a damping system.

3. The method according to claim 2, wherein step (a) comprises the taking into account of a spring travel.

4. The method according to claim 2 wherein step (a) comprises the taking into account of at least one of spring constants and damper constants.

5. The method according to claim 2 wherein step (a) comprises the taking into account of a spring force or a spring pressure.

6. The method according to claim 1, wherein generating the control commands in step (b) comprises a taking into account of tire characteristics.

7. The method according to claim 1, wherein in step (a) the vertical tire force is determined by estimation.

8. The method according to claim 1, wherein the control commands, which are generated in step (b), upon a change of the vertical tire force are directed towards a change of a manipulated variable of the anti-lock braking system in the same direction.

9. The method according to claim 1, wherein step (b) comprises the generation of a compensation signal on the basis of the quantity characteristic of the vertical tire force.

10. The method according to claim 9, wherein step (b) comprises the following sub-steps:
    (b1) generating uncompensated control commands while taking into account the motional state of at least one wheel; and
    (b2) generating control commands for the at least one actuator on the basis of the uncompensated control commands while taking the compensation signal into account.

11. The method according to claim 1, wherein in step (b) during generation of the control commands an electrical signal characteristic of a braking request is taken into account.

12. A method of operating an anti-lock braking system, in which as a function of the motional state of at least one wheel control commands are generated for at least one break actuator, comprising the steps:
    (a) determining on a continual basis a quantity characteristic of a vertical tire force that varies during vehicle travel; and
    (b) generating control commands for the at least one actuator depending on the quantity that has been determined in step (a), wherein, upon a change of the vertical tire force, the control commands are directed towards a change of an anti-lock braking system parameter in the same direction in which the change takes place.

13. A method of operating an anti-lock braking system, in which as a function of the motional state of at least one wheel one or more control commands are generated for at least one actuator, comprising the steps:
    (a) determining on a continual basis a quantity characteristic of a vertical tire force that varies during vehicle travel;
    (b) generating uncompensated control commands for the at least one actuator;
    (c) generating compensated control commands for the at least one actuator by compensating the uncompensated control commands generated in step (b), depending on the quantity determined in step (a); and
    (d) controlling the actuator on the basis of the compensated control commands.

14. An anti-lock braking system, which generates control commands for at least one brake actuator as a function of the motional state of at least one vehicle wheel, comprising:
    a determination unit for determining on a continual basis a quantity, characteristic of a vertical tire force that varies during vehicle travel; and a control unit for generating control commands for the at least one brake actuator during, an anti-lock control intervention, wherein the quantity characteristic of the vertical tire force is taken into account in the control commands generated for the at least one brake actuator.

15. The anti-lock braking system according to claim 14, wherein the control unit generates uncompensated control commands for the at least one brake actuator, the anti-lock braking system further comprising:

a compensation-calculating circuit for calculating a suitable compensation signal on the basis of the determined quantity characteristic of the vertical tire force; and an interface with the control unit for generating compensated control commands for the at least one brake actuator based on the compensation signal.

16. A method of operating an anti-lock braking system, in which as a function of the motional state of at least one wheel control commands are generated for at least one actuator, comprising the steps:

a) determining on a continual basis a quantity characteristic of a vertical tire force that varies during vehicle travel; and b) generating the control commands during an antilock control intervention taking into account the quantity determined in step (a);

wherein step (b) comprises: generating uncompensated control commands while taking into account the motional state of at least one wheel; generating a compensation signal on the basis of the determined quantity characteristic of the variable vertical tire force; and generating the control commands for the at least one actuator on the basis of the uncompensated control commands while taking the compensation signal into account.

* * * * *

UNITED STATES PATENT AND TRADEMARK OFFICE
CERTIFICATE OF CORRECTION

PATENT NO. : 6,973,381 B2 Page 1 of 1
APPLICATION NO. : 10/853531
DATED : December 6, 2005
INVENTOR(S) : Andrew Kingston It is certified that error appears in the above-identified patent and that said Letters Patent is hereby corrected as shown below:

Claim 13, Column 6, Line 50, after "one" insert --brake--.
Claim 14, Column 6, Line 66, change "a quantity, characteristic" to --a quantity characteristic--;
    Column 7, Line 2, change "brake actuator during, an anti-lock control" to --brake actuator during an anti-lock control--.
Claim 16, Column 8, Line 8 to end of claim, change
    "wherein step (b) comprises: generating uncompensated control commands while taking into
    "account the motional state of at least one wheel; generating a compensation signal on the basis of the determined
    "quantity characteristic of the variable verticle tire force; and generating the control commands for the at least one actuator on
    "the basis of the uncompensated control commands while taking the compensation signal into account."
    to
    --wherein step (b) comprises:
    --generating uncompensated control commands while taking into account the motional state of at least one wheel;
    --generating a compensation signal on the basis of the determined quantity characteristic of the variable vertical tire force; and
    --generating the control commands for the at least one actuator on the basis of the uncompensated control commands while taking the compensation signal into account.--

Signed and Sealed this

Fourteenth Day of November, 2006

JON W. DUDAS
*Director of the United States Patent and Trademark Office*